US010041285B2

(12) United States Patent
Kim et al.

(10) Patent No.: US 10,041,285 B2
(45) Date of Patent: Aug. 7, 2018

(54) APPARATUS AND METHOD FOR CONTROLLING SUNROOF TO PREVENT MALFUNCTIONS THEREOF

(71) Applicant: HYUNDAI KEFICO CORPORATION, Gunpo-si, Gyeonggi-do (KR)

(72) Inventors: Dae Woo Kim, Gunpo-si (KR); Yeong Hak Kim, Daejeon (KR); Hyun Kyu Oh, Seoul (KR)

(73) Assignee: HYUNDAI KEFICO CORPORATION, Gunpo-si (KR)

( * ) Notice: Subject to any disclaimer, the term of this patent is extended or adjusted under 35 U.S.C. 154(b) by 57 days.

(21) Appl. No.: 15/244,160

(22) Filed: Aug. 23, 2016

(65) Prior Publication Data

US 2017/0058587 A1 Mar. 2, 2017

(30) Foreign Application Priority Data

Aug. 24, 2015 (KR) ........................ 10-2015-0118792

(51) Int. Cl.
*H02P 31/00* (2006.01)
*E05F 15/41* (2015.01)
*E05F 15/603* (2015.01)
*E05F 15/73* (2015.01)

(52) U.S. Cl.
CPC ............ *E05F 15/41* (2015.01); *E05F 15/603* (2015.01); *E05F 15/73* (2015.01)

(58) Field of Classification Search
CPC ........................................................ H02P 31/00
USPC .................................................. 318/283, 280
See application file for complete search history.

(56) References Cited

U.S. PATENT DOCUMENTS 5,977,732 A * 11/1999 Matsumoto .......... H02H 7/0851 318/283
6,034,497 A 3/2000 Tamagawa et al.
8,558,490 B2 * 10/2013 Johansson ........... H02P 21/0089 318/400.02

(Continued)

FOREIGN PATENT DOCUMENTS

JP 10-257791 A 9/1998
JP 11-270226 A 10/1999

(Continued)

OTHER PUBLICATIONS

Korean Intellectual Property Office, Communication dated Jun. 26, 2017 in counterpart application No. 10-2015-0118792.

*Primary Examiner* — David S Luo
(74) *Attorney, Agent, or Firm* — Sughrue Mion, PLLC

(57) ABSTRACT

Disclosed herein is a sunroof control apparatus for preventing malfunctions. The sunroof control apparatus includes a sunroof motor which opens and closes a sunroof and a control portion which outputs a first control signal which drives the sunroof motor in a direction of opening the sunroof and a second control signal which drives the sunroof motor in a direction of closing the sunroof. Here, the control portion estimates angular velocity, torque, and a torque change rate according to a current voltage of the sunroof motor based on an estimator designed in advance. Also, when the estimated torque change rate is a preset threshold or more, the control portion determined that an object is caught in the sunroof while the sunroof is being closed and outputs the first control signal.

11 Claims, 2 Drawing Sheets

(56) References Cited

U.S. PATENT DOCUMENTS 9,239,579 B2 * 1/2016 Schlesiger ............ G05B 24/02

FOREIGN PATENT DOCUMENTS

| | | | |
|---|---|---|---|
| JP | 2010-119210 | A | 5/2010 |
| KR | 10-2008-0044378 | A | 5/2008 |
| KR | 10-2012-0039230 | A | 4/2012 |

* cited by examiner

APPARATUS AND METHOD FOR CONTROLLING SUNROOF TO PREVENT MALFUNCTIONS THEREOF

CROSS-REFERENCE TO RELATED APPLICATION

This application claims priority to and the benefit of Korean Patent Application No. 2015-0118792, filed on Aug. 24, 2015, the disclosure of which is incorporated herein by reference in its entirety.

BACKGROUND

1. Field of the Invention

The present invention relates to an apparatus and a method for controlling a sunroof, and more particularly, to an apparatus and a method for controlling a sunroof in which opening and closing of the sunroof are controlled to prevent malfunctions.

2. Discussion of Related Art

Recently, the number of vehicles with a motor-operated sunroof which can automatically open and close a part of a cover of a vehicle is increasing.

In the case of such motor-operated sunroofs described above, when a foreign object gets caught while a sunroof is sliding to be closed or tilting down, there may be a risk of an accident that threatens safety.

Accordingly, to prevent safety accidents, a motor-operated sunroof includes an apparatus for stopping a motor thereof and then opening the sunroof when a phenomenon in which a piece of material gets caught in the sunroof occurs.

However, a general motor-operated sunroof may determine that an object is caught and may malfunction even when a part of a human body or an object is not caught, due to an external cause such as vibrations of a vehicle.

Related to this, Korean Patent Publication No. 10-2008-0044378, titled "Sunroof control method and control unit", discloses a technology of controlling a sunroof to open by driving a brushless direct current (BLDC) motor in reverse, when it is determined that a part of a human body or an object is caught.

SUMMARY OF THE INVENTION

An aspect of the present invention is to provide an apparatus and a method for controlling a sunroof capable of preventing malfunctions by determining whether an object such as foreign material, etc. gets caught by estimating torque change rate using an estimator designed based on a parameter calculated through modeling of a sunroof motor used in the sunroof and comparing the torque change rate with a preset threshold.

However, aspects to be achieved by embodiments of the present invention are not limited to the described above and additional aspects may be present.

According to an aspect of the present invention, a sunroof control apparatus for preventing malfunctions includes a sunroof motor which opens and closes a sunroof and a control portion which outputs a first control signal which drives the sunroof motor in a direction of opening the sunroof and a second control signal which drives the sunroof motor in a direction of closing the sunroof. Here, the control portion estimates angular velocity, torque, and a torque change rate according to a current voltage of the sunroof motor based on a previously designed estimator. Also, when the estimated torque change rate is a preset threshold or more, the control portion determined that an object is caught in the sunroof while the sunroof is being closed and outputs the first control signal. According to another aspect of the present invention, a sunroof control method for preventing malfunctions includes estimating angular velocity, torque, and a torque change rate according to a current voltage of a sunroof motor based on a previously designed estimator, comparing the estimated torque change rate with a preset threshold, determining that an object sticks in the sunroof while the sunroof is being closed when the estimated torque change rate is the preset threshold or more as a result of the comparison, and driving the sunroof motor in a direction of opening the sunroof.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
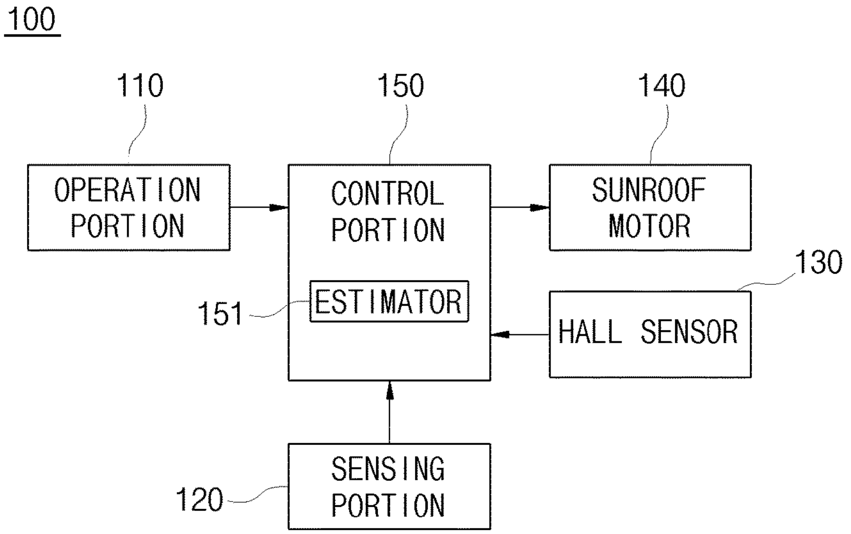
FIG. 1 is a block diagram of a sunroof control apparatus according to one embodiment of the present invention.

Hereinafter, embodiments of the present invention will be described in detail with reference to the attached drawings to allow one of ordinary skill in the art to easily execute the present invention. However, the present invention may be embodied in several various forms and is not limited to the embodiments described below. Also, throughout the drawings, a part irrelevant to a description of the present invention will be omitted to clearly explain the present invention. Throughout the specification, like reference numerals refer to like portions.

Also, when it is stated that one part is "connected" to another part, the one part may not only be "directly connected" but also be "electrically connected" to the other part with another device therebetween.

Also, when it is stated that one member is located "above" another member, not only may the one member be in contact with the other member but also another member may be present between the two members.

Also, when it is described that a part "includes" an element, unless defined otherwise, it means that the part does not exclude other elements but may further include other elements. Also, the terms "about", "substantially", etc. used herein mean numerical values or approximate numerical values of intrinsic manufacturing and material tolerances provided to stated meanings and also are used to prevent unconscionable infringers from illegally using the disclosed content in which a definite or absolute numerical value is stated to allow the present invention to be understood. The term "an operation in which something is done" or "an operation of doing something" used herein does not mean "an operation for (doing) something".

Hereinafter, a sunroof control apparatus 100 according to one embodiment of the present invention will be described in detail with reference to FIGS. 1 and 2.

FIG. 1 is a block diagram of the sunroof control apparatus 100 according to one embodiment of the present invention.

Figure 2:
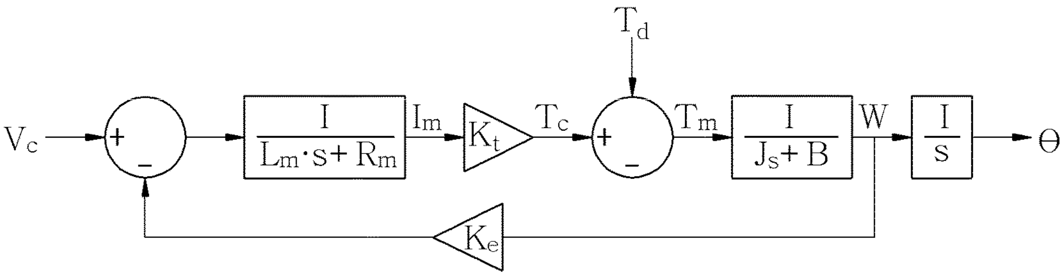
FIG. 2 is a view of an estimator according to one embodiment of the present invention.

FIG. 2 is a view of an estimator 151 according to one embodiment of the present invention.

As shown in FIG. 1, the sunroof control apparatus 100 according to one embodiment of the present invention includes an operation portion 110, a sensing portion 120, a hall sensor 130, a sunroof motor 140, and a control portion 150. The sunroof control apparatus 100 according to one embodiment of the present invention includes one hall sensor In FIG. 1, but may include one or more hall sensors.

The operation portion 110 is configured to operate opening and closing of a sunroof. Here, the operation portion 110 receives an operation of a user for opening and closing of the sunroof and transmits the operation to the control portion 150.

The operation portion 110 may include a sunroof opening switch and a sunroof closing switch. For example, even though the operation portion 110 may be externally shown as a single button, the operation portion 110 may be configured to allow the sunroof opening switch to be operated when a first portion is pressed and to allow the sunroof closing switch to be operated when a second portion is pressed. Hereinafter, for convenience of description, a case in which the operation portion 110 includes the sunroof opening switch and the sunroof closing switch will be described as an example.

The operation portion 110 may be provided at a position such as a head unit, etc. to allow a passenger in a vehicle, for example, a driver, to easily operate.

The operation portion 110 is connected to the control portion 150 through wires and may be connected wirelessly.

The sensing portion 120 may check whether the sunroof is in a closed state or an opened state and notify the control portion 150 of it. Here, the sensing portion 120 may determine the sunroof to be in the closed state when the sunroof is completely closed and may determine the sunroof to be in the opened state when the sunroof is opened even a little.

For example, the sensing portion 120 may have a button shape operated, for example, pressed when the sunroof is to be closed or may be a hall sensor which senses closing of the sunroof by sensing a magnet provided at an end of the sunroof. Since the shape of the sensing portion 120 can be obviously derived by one of ordinary skill in the art from the content of the specification, a detailed description thereof will be omitted.

The hall sensor 130 senses whether the sunroof motor 140 is driven and a driven direction of the sunroof motor 140 and transmits a sensing signal that is an output signal of the hall sensor 130 to the control portion 150. Here, the hall sensor 130 refers to an element in which a voltage level of a sensing signal that is an output signal changes depending on the intensity of a magnetic field. For this, the hall sensor 130 may be provided at a position capable of sensing a magnetic field which changes according to rotation of the sunroof motor 140.

The sunroof motor 140 may be driven forward or backward under the control of the control portion 150 to open and close the sunroof. Here, the sunroof may be a window provided at a roof of a vehicle.

In detail, the sunroof motor 140 may open the sunroof by moving a sunroof gear engaged with the sunroof in a direction of opening the sunroof when driven forward and may close the sunroof by moving the sunroof gear in a direction of closing the sunroof when driven backward.

The control portion 150 opens and closes the sunroof by driving the sunroof motor 140 in response to the operation of the user for the operation portion 110.

For example, when a motor driving portion (not shown) is further included between the control portion 150 and the sunroof motor 140, the control portion 150 outputs a first control signal for driving the sunroof motor 140 in the direction of opening the sunroof, for example, a forward direction of the motor driving portion. Also, on the contrary, a second control signal which drives the sunroof motor 140 in the direction of closing the sunroof, for example, a backward direction is output. Accordingly, the motor driving portion receives the first control signal or the second control signal and drives the sunroof motor 140 in the forward direction or the backward direction corresponding thereto.

For example, the motor driving portion is a switching device and may be turned on when a first control signal that is a digital signal is received and may supply adequate driving current to the sunroof motor 140.

However, as the user pushes the sunroof closing switch, the control portion 150 may output a second control signal to operate the sunroof in the closing direction. As described above, to prevent a phenomenon in which an object, for example, a part of a human body, gets caught while the sunroof is operating in the closing direction or to prevent malfunctioning when there is no object, the control portion 150 estimates angular velocity, torque, and a torque change rate according to a current voltage of the sunroof motor 140 based on the estimator 151 designed in advance. Also, when the estimated torque change rate is a preset threshold or more, it is determined that the object gets caught in the sunroof while the sunroof is being closed and the first control signal is output.

In detail, the control portion 150 may calculate a ratio according to a difference between the angular velocity estimated by the estimator 151 and angular velocity actually measured at the sunroof motor 140. Also, the ratio described above may be applied to the torque change rate estimated by the estimator 151.

As described above, when the estimated torque change rate to which the ratio according to the difference between the angular velocity is applied is a preset threshold or more, the control portion 150 may determine that an object gets caught in the sunroof while the sunroof is being closed and may output a first control signal. Accordingly, the sunroof motor 140 may operate the sunroof in the opening direction according to the first control signal.

On the other hand, when the estimated torque change rate to which the ratio according to the difference between the angular velocity is applied is less than the preset threshold, the control portion 150 may determine that no object is caught in the sunroof while the sunroof is being closed and may maintain outputting of the second control signal. Accordingly, the sunroof motor 140 may operate the sunroof in the closing direction according to the second control signal.

Meanwhile, referring to FIG. 2, the estimator 151 according to one embodiment of the present invention may be designed based on a parameter applied to the sunroof motor 140. Here, the parameter applied to the sunroof motor 140 may be calculated based on the voltage and angular velocity of the sunroof motor 140, and accordingly the calculated parameter may include one or more of inductance, a torque constant, inertial moment, resistance, a counter-electromotive constant, and a coefficient of friction.

In other words, the estimator 151 applied to one embodiment of the present invention may be designed using a parameter obtained through modeling of the sunroof motor 140 used in the sunroof. The estimator 151 described above may be designed based on an H infinity filter.

Here, the H infinity filter is one of filters generally used for a robust control method, is for constructing a control system which suppresses an effect of a disturbance signal, and is for minimizing an estimated output in the worst case with respect to a certain limited vortex. The H infinity filter described above, unlike a Kalman filter generally used, does not need statistical data with respect to noise.

Meanwhile, the control portion 150 according to one embodiment of the present invention may include a memory in which a program for controlling the sunroof is stored and a processor which executes the program.

That is, the control portion 150 according to the embodiments of the present invention means software or a hardware element such as field programmable gate array (FPGA) and an application specific integrated circuit (ASIC) and may perform certain functions.

However, the control portion 150 is not limited in meaning to software or hardware and may be configured to be present in a storage medium capable of addressing or may be configured to run one or more processors.

Accordingly, for example, the control portion 150 may include elements such as software elements, object-oriented software elements, class elements, and task elements, processes, functions, properties, procedures, subroutines, segments of program codes, drivers, firmware, micro codes, a circuit, data, a database, data structures, tables, arrays, and variables.

Also, functions provided by the control portion 150 may be combined into a smaller number of elements or may be further separated into additional elements.

Nonvolatile storage devices which continuously maintain stored information even when power is not supplied and volatile storage devices are collectively called memories.

For example, memories may include NAND flash memories such as a compact flash (CF) card, a secure digital (SD) card, a memory stick, a solid-state drive (SSD), etc., a magnetic computer memory device such as hard disk drive (HDD), etc., and optical disc drives such as a compact disc read-only memory (CD-ROM), a digital versatile disk-ROM, etc.

Also, a program stored in a memory may be embodied as software or hardware such as an FPGA and an ASIC and may perform certain functions.

Hereinafter, a method of controlling a sunroof will be described with reference to FIG. 3.

Figure 3:
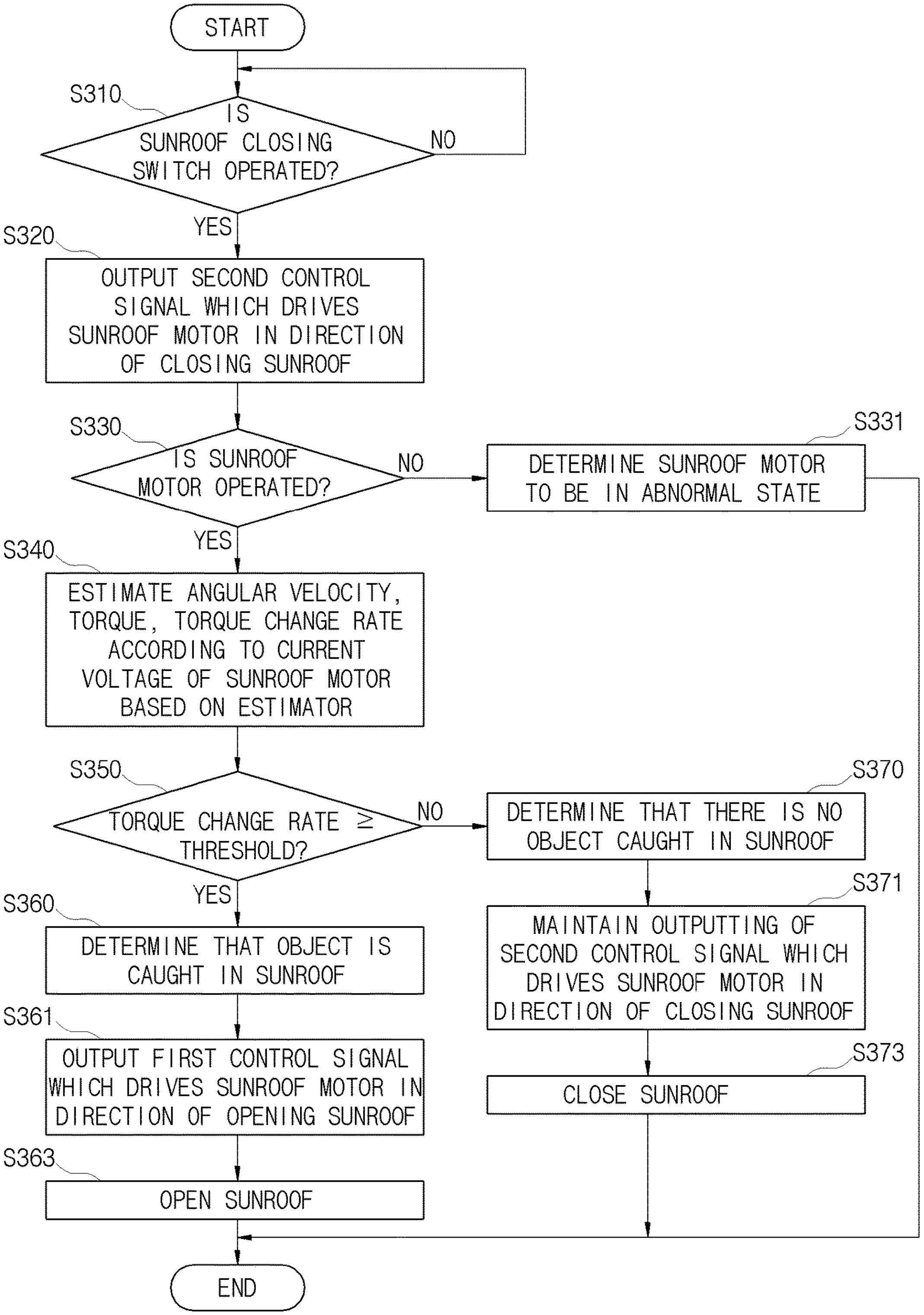
FIG. 3 is a view illustrating a sunroof control method according to one embodiment of the present invention.

FIG. 3 is a view illustrating a sunroof control method according to one embodiment of the present invention.

In the sunroof control method using the sunroof control apparatus 100 according to one embodiment of the present invention, first, whether a sunroof closing switch is being operated while a sunroof is opened is checked (S310). Accordingly, when the sunroof closing switch is being operated, the sunroof control apparatus 100 outputs a second control signal which drives the sunroof motor 140 in a direction of closing the sunroof (S320).

For example, when the motor driving portion is further included between the control portion 150 and the sunroof motor 140, the control portion 150 may output the second control signal to the motor driving portion. The motor driving portion, which is, for example, a switching element may be turned on when receiving the second control signal and may supply adequate backward driving current to the sunroof motor 140.

The sunroof control apparatus 100 checks whether the sunroof motor 140 is being driven according to the second control signal (S330). For example, the sunroof control apparatus 100 may check whether the sunroof motor 140 is being driven by checking one end of the sunroof motor 140 at different levels while the sunroof motor 140 is not being driven or driven or a signal of a node of a peripheral circuit thereof. Accordingly, when the sunroof motor 140 is not being driven, it may be determined that the sunroof motor 140 is in an abnormal state (S331).

Unlike this, when the sunroof motor 140 is driven, the sunroof control apparatus 100 may estimate angular velocity, torque, and a torque change rate according to a current voltage of the sunroof motor 140 based on the estimator 151 previously designed (S340). Also, the estimated torque change rate is compared with a preset threshold (S350).

As a result of the comparison, when the estimated torque change rate is the preset threshold or more, it is determined that an object is caught in the sunroof while the sunroof is being closed (S360). Also, the sunroof control apparatus 100 outputs a first control signal which drives the sunroof motor 140 in a direction of opening the sunroof (S361) and allows the sunroof which is operating in a closing direction to operate in an opening direction again (S363). Accordingly, the sunroof control method according to one embodiment of the present invention may prevent safety accidents by allowing the sunroof to operate in the opening direction when an object gets caught in the sunroof while the sunroof is operating in the closing direction.

Meanwhile, as a result of the comparison, when the estimated torque change rate is less than the preset threshold, it is determined that there is no object caught in the sunroof while the sunroof is being closed (S370). Also, the sunroof control apparatus 100 maintains outputting the second control signal which drives the sunroof motor 140 in the direction of closing the sunroof (S371) and closes the sunroof (S373). Accordingly, the sunroof control method according to one embodiment of the present invention may prevent the occurrence of malfunctions caused by vibration and friction while the sunroof is being closed.

Meanwhile, the estimator 151 may calculate a ratio according to a difference between an estimated angular velocity and an actually measured angular velocity and may apply the calculated ratio to the torque change rate. Also, the torque change rate to which the ratio is applied may be compared with the preset threshold and it may be determined whether an object is caught in the sunroof while the sunroof is being closed.

The estimator 151 according to one embodiment of the present invention described above may be designed based on a parameter applied to the sunroof motor 140. Here, the parameter applied to the sunroof motor 140 may be calculated based on the voltage and angular velocity of the sunroof motor 140 and accordingly the calculated parameter may include one or more of inductance, a torque constant, inertial moment, resistance, a counter-electromotive constant, and a coefficient of friction.

In other words, the estimator 151 applied to one embodiment of the present invention may be designed using a parameter obtained through modeling the sunroof motor 140 used in the sunroof. The estimator 151 described above may be designed based on an H infinity filter.

In the above description, operations S310 to S373, depending on examples of the embodiments of the present invention, may be further divided into additional operations or may be combined into a smaller number of operations. Also, some operations may be omitted as necessary, and order of operations may be changed.

The sunroof control method using the sunroof control apparatus 100 according to one embodiment of the present invention may be embodied as a computer program stored in a computer-executable medium or a recording medium including a computer-executable command. Computer-readable media may be random available media accessible by a computer and include all volatile media, nonvolatile media, separable media, and inseparable media. Also, computer-readable media may include all computer storage media and communication media. The computer storage media include all volatile media, nonvolatile media, separable media, and inseparable media embodied using random methods or technologies for information such as a computer-readable command, a data structure, a program module, and other data. The communication media typically include a computer-readable command, a data structure, a program module, or other data of a modulated data signal such as a carrier wave, or other transmission mechanisms and include random information transfer media.

The method and system according to the particular embodiment of the present invention have been described, but some or all of elements or operations thereof may be embodied using a computer system including a universal hardware-architecture.

According to any one of embodiments of the present invention described above, it is possible to determine whether an object gets caught in a sunroof while the sunroof is operating in a direction to be closed.

Particularly, since it is determined, by comparing a torque change rate estimated by an estimator with a threshold, whether the object is caught, a malfunctioning phenomenon which occurs even when there is no real object may be prevented.

The above description of the present invention is exemplary, and it will be understood that the embodiment of the present invention may be easily modified by one of ordinary skill in the art without changing of the technical features or essential properties of the present invention. Therefore, the embodiments described above should be understood as being exemplary in all aspects and not limited. For example, elements described as a single type may be executed while being distributed, and similarly elements described as being distributed may be executed while being combined.

The scope of the present invention will be defined by the following claims rather than the above detailed description, and all changes and modifications derived from the meaning and the scope of the claims and equivalents thereof should be understood as being included in the scope of the present invention.

What is claimed is:

1. A sunroof control apparatus for preventing malfunctions, comprising:

a sunroof motor which opens and closes a sunroof; and a control portion which outputs a first control signal which drives the sunroof motor in a direction of opening the sunroof and a second control signal which drives the sunroof motor in a direction of closing the sunroof, wherein the control portion estimates angular velocity, torque, and a torque change rate according to a current voltage of the sunroof motor based on an estimator designed in advance;

wherein the control portion applies a ratio according to a difference between the estimated angular velocity and actually measured angular velocity to the estimated torque change rate; and when the estimated torque change rate is a preset threshold or more, the control portion determined that an object is caught in the sunroof while the sunroof is being closed and outputs the first control signal.

2. The sunroof control apparatus of claim 1, wherein the estimator is designed based on a parameter applied to the sunroof motor, and wherein the parameter is calculated based on the voltage and the angular velocity of the sunroof motor and comprises one or more of inductance, a torque constant, inertial moment, resistance, a counter-electromotive constant, and a coefficient of friction.

3. The sunroof control apparatus of claim 1, wherein the estimator is designed based on an H infinity filter.

4. The sunroof control apparatus of claim 1, wherein when the estimated torque change rate is less than the preset threshold, the control portion determined that no object is caught in the sunroof while the sunroof is being closed and maintains the outputting of the second control signal.

5. A sunroof control apparatus for preventing malfunctions, comprising:

a sunroof motor which opens and closes a sunroof; and a control portion which outputs a first control signal which drives the sunroof motor in a direction of opening the sunroof and a second control signal which drives the sunroof motor in a direction of closing the sunroof, wherein the control portion estimates angular velocity, torque, and a torque change rate according to a current voltage of the sunroof motor based on an estimator designed in advance;

wherein the control portion applies a ratio according to a difference between the estimated angular velocity and actually measured angular velocity to the estimated torque change rate; and wherein when the estimated torque change rate is less than the preset threshold, the control portion determined that no object is caught in the sunroof while the sunroof is being closed and maintains the outputting of the second control signal.

6. The sunroof control apparatus of claim 5, wherein when the estimated torque change rate is a preset threshold or more, the control portion determined that an object is caught in the sunroof while the sunroof is being closed and outputs the first control signal.

7. The sunroof control apparatus of claim 5, wherein the estimator is designed based on a parameter applied to the sunroof motor, and wherein the parameter is calculated based on the voltage and the angular velocity of the sunroof motor and comprises one or more of inductance, a torque constant, inertial moment, resistance, a counter-electromotive constant, and a coefficient of friction.

8. The sunroof control apparatus of claim 5, wherein the estimator is designed based on an H infinity filter.

9. A sunroof control method for preventing malfunctions, comprising:

estimating angular velocity, torque, and a torque change rate according to a current voltage of a sunroof motor based on an estimator designed in advance;

comparing the estimated torque change rate with a preset threshold;

determining that an object is caught in the sunroof while the sunroof is being closed when the estimated torque change rate is the preset threshold or more as a result of the comparison; and driving the sunroof motor in a direction of opening the sunroof, wherein the estimating of the torque change rate comprises:

calculating a ratio according to a difference between the estimated angular velocity and actually measured angular velocity; and applying the calculated ratio to the estimated torque change rate; and wherein the comparing of the estimated torque change rate with the preset threshold is comparing the torque change rate to which the calculated ratio is applied with the preset threshold.

10. The sunroof control method of claim 9, wherein the estimator is designed based on a parameter applied to the sunroof motor, and wherein the parameter is calculated based on the voltage and the angular velocity of the sunroof motor and comprises one or more of inductance, a torque constant, inertial moment, resistance, a counter-electromotive constant, and a coefficient of friction.

11. The sunroof control method of claim 9, wherein the estimator is designed based on an H infinity filter.

* * * * *